2,938,831
Patented May 31, 1960

2,938,831
CONTROL OF NEMATODES USING DIALKYL PYRAZINYL PHOSPHOROTHIOATES

Fred M. Gordon, Bethel, Conn., assignor to American Cyanamid Company, New York, N.Y., a corporation of Maine No Drawing. Filed Feb. 17, 1958, Ser. No. 715,499

12 Claims. (Cl. 167—33)

The present invention relates to the control of nematodes and other parasitic worm life which exist in the soil at some stage of their life cycles, for example eggs, larvae and adult worms. More particularly, it is concerned with a class of phosphate esters which are highly effective in controlling nematodes, and with nematocidal compositions containing the same.

These nematocidal compounds are the O,O-dialkyl O-(2-pyrazinyl) phosphorothioates which may be represented by the general formula:

$$\begin{array}{c} R-O \\ \phantom{R-}\diagdown \\ \phantom{R-O}P-O- \\ \phantom{R-}\diagup \phantom{\diagdown} \\ R'-O \end{array} \begin{array}{c} S \\ \| \\ \phantom{=} \end{array} \begin{array}{c} \diagup N \diagdown \\ \phantom{=} \diagdown \diagup \\ Z \phantom{=} N \end{array} \begin{array}{c} -X \\ \phantom{=} \\ -Y \end{array}$$

(I)

wherein R and R' are chosen from the group of lower alkyl radicals such as methyl, ethyl, propyl, isopropyl and butyl, and X, Y and Z represent a member of the group consisting of hydrogen, a halogen, a phenyl radical and a lower alkyl radical.

Because these esters are derived in part from hydroxypyrazine compounds which exist as tautomers, a plausible argument can be made that Formula I above does not cover all the possible isomeric and tautomeric equivalents. It is to be understood that Formula I above is used in a generic sense to represent the compounds even though other representative formulae can be written.

The above compounds may be readily prepared by reacting a dialkyl phosphorochloridothioate of the formula:

$$\begin{array}{c} R-O \\ \phantom{R-}\diagdown \\ \phantom{R-O}P-Cl \\ \phantom{R-}\diagup \\ R'-O \end{array} \begin{array}{c} S \\ \| \\ \phantom{=} \end{array}$$

in which R and R' have the meaning shown above, with an alkali metal salt of an hydroxypyrazine of the formula:

$$\text{alkali metal}-O-\begin{array}{c} \diagup N \diagdown \\ \phantom{=} \diagdown \diagup \\ Z \phantom{=} N \end{array} \begin{array}{c} -X \\ \phantom{=} \\ -Y \end{array}$$

in which X, Y and Z have the meaning shown above, in an inert solvent at a temperature within the range of from about 10° C. to 100° C.

The preparation of the phosphorothioate compounds is further illustrated by the following specific examples.

EXAMPLE 1

*O,O-diethyl O-(2-pyrazinyl) phosphorothioate*

$$\begin{array}{c} C_2H_5-O \\ \phantom{C_2H_5-}\diagdown \\ \phantom{C_2H_5-O}P-O- \\ \phantom{C_2H_5-}\diagup \\ C_2H_5-O \end{array} \begin{array}{c} S \\ \| \\ \phantom{=} \end{array} \begin{array}{c} \diagup N \diagdown \\ \phantom{=} \diagdown \diagup \\ \phantom{=} N \end{array}$$

To a slurry of 11.8 g. (0.1 mol) of the sodium salt of 2-hydroxypyrazine in 150 cc. of N-methyl-2-pyrrolidone, 18.9 g. (0.1 mol) of O,O-diethyl phosphorochloridothioate was added with stirring. The temperature of the mixture rose immediately to 50° C., and stirring was continued at about 40° C. for three hours. The reaction mixture was filtered, and the precipitate was washed with a small portion of N-methyl-2-pyrrolidone. The combined filtrates were concentrated to remove the solvent, and the resulting residue was dissolved in 100 cc. of toluene. The toluene solution was washed with 10% aqueous sodium carbonate and then with saturated sodium chloride solution to neutrality. After drying over anhydrous magnesium sulfate, the toluene solution was concentrated in vacuo and the residue was filtered through a Hyflo-magnesium sulfate mat to give 19.9 g. (73% of theory) of product, a clear amber-colored liquid having a refractive index $n_D^{25}$ 1.5131.

EXAMPLE 2

*O,O-diethyl O-(3,5,6-trimethyl-2-pyrazinyl) phosphorothioate*

$$\begin{array}{c} C_2H_5-O \\ \phantom{C_2H_5-}\diagdown \\ \phantom{C_2H_5-O}P-O- \\ \phantom{C_2H_5-}\diagup \\ C_2H_5-O \end{array} \begin{array}{c} S \\ \| \\ \phantom{=} \\ \phantom{=} \\ CH_3 \end{array} \begin{array}{c} \diagup N \diagdown \\ \phantom{=} \diagdown \diagup \\ \phantom{=} N \end{array} \begin{array}{c} -CH_3 \\ \phantom{=} \\ -CH_3 \end{array}$$

To a slurry of 16 g. of the sodium salt of 2-hydroxy-3,5,6-trimethylpyrazine in 175 cc. of methyl isobutyl ketone, 18.9 g. of O,O-diethyl phosphorochloridothioate was added with stirring. The mixture was heated at 40–45° C. for a period of three hours, then filtered, and the precipitate was washed with a small portion of methyl isobutyl ketone. The combined filtrates were washed with 10% aqueous sodium carbonate and then with saturated sodium chloride solution to neutrality. After drying over anhydrous magnesium sulfate, the ketone solution was concentrated in vacuo to give 20.6 g. (71% of theory) of product, a clear amber-colored liquid having a refractive index $n_D^{25}$ 1.5049.

Other typical nematocidal compounds of the invention are:

O,O-dimethyl O-(2-pyrazinyl) phosphorothioate
O,O-dibutyl O-(2-pyrazinyl) phosphorothioate
O,O-diethyl O-(3-methyl-2-pyrazinyl) phosphorothioate
O,O-diethyl O-(5,6-dimethyl-2-pyrazinyl) phosphorothioate
O,O-diethyl O-(6-chloro-2-pyrazinyl) phosphorothioate
O,O-diisopropyl O-(6-chloro-2-pyrazinyl) phosphorothioate
O,O-dibutyl O-(6-chloro-2-pyrazinyl) phosphorothioate
O,O-diethyl O-(5-phenyl-2-pyrazinyl) phosphorothioate
O,O-diethyl O-(5,6-diphenyl-2-pyrazinyl) phosphorothioate
O,O-dimethyl O-(5,6-diphenyl-2-pyrazinyl) phosphorothioate
O,O-diethyl O-(6-bromo-2-pyrazinyl) phosphorothioate
O,O-diethyl O-(3-phenyl-2-pyrazinyl) phosphorothioate
O,O-diethyl O-(5,6-diethyl-2-pyrazinyl) phosphorothioate
O,O-diethyl O-(3-chloro-5,6-dimethyl-2-pyrazinyl) phosphorothioate
O,O-diethyl O-(3-ethyl-5,6-dichloro-2-pyrazinyl) phosphorothioate
O,O-dimethyl O-(5,6-diethyl-2-pyrazinyl) phosphorothioate
O,O-dimethyl O-(3-isopropyl-2-pyrazinyl) phosphorothioate
O,O-dimethyl O-(6-chloro-2-pyrazinyl) phosphorothioate
O,O-diisopropyl O-(5-ethyl-2-pyrazinyl) phosphorothioate
O,O-dipropyl O-(3-phenyl-2-pyrazinyl) phosphorothioate
O,O-dibutyl O-(3,5,6-trimethyl-2-pyrazinyl) phosphorothioate
O,O-dibutyl O-(6-bromo-2-pyrazinyl) phosphorothioate
O,O-diisopropyl O-(2-pyrazinyl) phosphorothioate
O,O-diisobutyl O-(5-methyl-2-pyrazinyl) phosphorothioate The phosphorothioate esters may be applied alone to the soil, or they may be formulated on granules for application with a conventional fertilizer spreader, as an emulsifiable concentrate or wettable powder for application with sprayers, as a dust for application with a conventional duster, or adsorbed on activated carbon for application to seeds. Since the esters have relatively low vapor pressures, they may be formulated as emulsifiable concentrates suitable for application in irrigation water.

It is an advantage of the present invention that the nematocidal compounds characterized above are effective when employed in dilute concentrations. It is preferred, therefore, to incorporate the compounds in a variety of suitable solid or liquid carriers or diluents. Such compositions can be prepared either as a suspension in a suitable non-solvent or as a dust. A suspension or dispersion of the nematocidal compound in a non-solvent such as water may be prepared for direct application to infested soils. Alternatively, a prepared suspension of the compound may be modified by the addition thereto of small amounts, usually from about 1 to about 5 parts, of a commercially available dispersing or surface active agent per 100 parts of the nematocidal compound. Examples of surface active compounds are: the sodium salt of polymerized propyl naphthylene sulfonic acid (Daxad 11), an alkyl aryl polyether alcohol (Triton X-100), and a modified phthalic glycerol alkyd resin (Triton B-1956).

In the preparation of dusts, the nematocidal compound may be admixed with a finely-divided inert granular material as a carrier in any conventional manner. Useful carriers include kaolin, bentonite, talc, pumice, silica, chalk, wood flour, fuller's earth, activated carbon, charcoal and the like.

The following examples further illustrate the invention but are not to be construed as limiting the same.

EXAMPLE 3

Four ml. aliquots of the pyrazinyl phosphorothioates in water at concentrations of 0.1, 0.01 and 0.001 percent were placed in vials. To each vial was added 100 Anguillula nematodes. The vials were rotated for twenty hours, and thereafter mortality counts were recorded as shown in Table 1.

TABLE 1

| Compound | Percent Kill of Nematodes | | |
|---|---|---|---|
|  | 0.1% | 0.01% | 0.001% |
| O,O-diethyl O-(2-pyrazinyl) phosphorothioate | | 100 | 75 |
| O,O-diethyl O-(6-chloro-2-pyrazinyl) phosphorothioate | 100 | 98 | 0 |
| O,O-diethyl O-(3-methyl-2-pyrazinyl) phosphorothioate | 100 | 0 | |
| O,O-diethyl O-(5,6-dimethyl-2-pyrazinyl) phosphorothioate | | 100 | 75 |
| O,O-diethyl O-(3,5,6-trimethyl-2-pyrazinyl) phosphorothioate | 98 | 0 | |
| O,O-diethyl O-(5-phenyl-2-pyrazinyl) phosphorothioate | 98 | 50 | 0 |
| O,O-dimethyl O-(2-pyrazinyl) phosphorothioate | 100 | 0 | |
| O,O-diisopropyl O-(6-chloro-2-pyrazinyl) phosphorothioate | 50 | 0 | |

EXAMPLE 4

The pyrazinyl phosphorothioates were mixed thoroughly into soil either as a granular formulation or in an aqueous carrier at rates not exceeding 50 pounds of active ingredient per acre. After the compounds were mixed in the soil, an aliquot of root-knot nematode larvae, eggs and galled root tissue was added with further mixing. The treated infested soils were then placed in crocks in an 80° F. greenhouse. On the following day, one seedling tomato plant was placed in each crock. After standing for a period of 45 days, the tomato plant roots were washed free of soil and rated according to the root-knot nematode galling present. The following gall index was used: 0=complete absence of galls, 1=1-10 galls, and 2=severe galling. The results were recorded as shown in Table 2.

TABLE 2

| Compound | Dosage, Pounds Per Acre | Root-Knot Index, Replication | |
|---|---|---|---|
|  |  | I | II |
| O,O-diethyl O-(2-pyrazinyl) phosphorothioate | 2.5 | 0 | 0 |
| O,O-diethyl O-(6-chloro-2-pyrazinyl) phosphorothioate | 2.5 | 0 | 0 |
| O,O-diethyl O-(5,6-dimethyl-2-pyrazinyl) phosphorothioate | 5 | 0 | 0 |
| O,O-diethyl O-(3-methyl-2-pyrazinyl) phosphorothioate | 50 | 0 | 0 |
| O,O-diisopropylO-(6-chloro-2-pyrazinyl) phosphorothioate | 50 | 0 | 1 |
| Check | | 2 | 2 |

EXAMPLE 5

Square foot flats of soil containing root-knot nematode eggs and larvae were treated with O,O-diethtyl O-(2-pyrazinyl) phosphorothioate adsorbed on 30-60 mesh granular Celite (salt water diatomaceous earth) at the rate of five and ten pounds of the phosphorothioate per acre. The granules were then worked into the soil with a hand weeder to simulate a field discing operation. Seedling tomatoes were planted immediately.

Approximately four weeks after treatment and thereafter at weekly intervals, one tomato plant was lifted and the roots examined for root-knot nematode galling. No galls were found on any of the plants from the flats of soil treated with O,O-diethyl O-(2-pyrazinyl) phosphorothioate, although plants from the untreated flats had severe galling.

The type granules used in this experiment can be applied with any standard fertilizer spreader. The results of this experiment show that a granular formulation of the phosphorothioate can be mixed in the soil with sufficient uniformity by mechanical equipment to give excellent control of the root-knot nematode.

EXAMPLE 6

Soil in eight inch diameter bulb pans, infested with root-knot nematode larvae and eggs, was sprayed with an aqueous emulsion of O,O-diethyl O-(2-pyrazinyl) phosphorothioate 24 hours prior to planting ten tomato seeds in each pan. The concentration of the phosphorothioate was 0.5 percent and the rate of application was 86 gallons of liquid per acre. This is equivalent to 3.6 pounds of O,O-diethyl O-(2-pyrazinyl) phosphorothioate per acre. In addition, some pans received one additional equivalent spray directly over the seedling tomatoes one week after the initial spray application.

The percent emergence of plants after 17 days, the percent stand after 40 days, and the average height after 25 days were recorded as shown in Table 3.

TABLE 3

| Treatment | Percent Emergence After 17 Days | Percent Stand After 40 Days | Average Height After 25 Days, inches |
|---|---|---|---|
| Infested check | 70 | [1] 17 | 2 |
| Pre-planting spray | 90 | 90 | 4 |
| Pre-planting spray and one additional | 90 | 90 | 4 |

[1] Reduced stand due to nematodes killing the plants.

Fifty-two days after planting the tomato seed, a final stand count was made and comparative vigor estimated when the roots of the tomato plants were examined. The results were recorded as shown in Table 4.

TABLE 4

| Treatment | Percent Stand | Average Root-Knot Index [1] | Plant Vigor |
|---|---|---|---|
| Infested check | [2] 10 | 3.8 | Fair. |
| Pre-planting spray | 90 | 1.5 | Excellent. |
| Pre-planting spray and one additional. | 90 | 1.5 | Excellent. |

[1] Root-knot index: 0=no galling, 1=less than 5% of roots exhibiting small galls, 2=6 to 25% of roots galled, 3=26 to 50% of roots galled, 4=51 to 95% of roots galled, 5=96 to 100% of roots galled.
[2] Reduced stand due to nematodes killing the plants.

It is well known that massive invasion of root-knot nematodes into the roots of seedling plants will kill them or stunt them so badly as to render them essentially worthless. It is apparent from the results of this experiment that excellent protection of the tomato plants was obtained.

EXAMPLE 7

Tomato seeds were coated with an activated carbon dust containing 50% O,O-diethyl O-(2-pyrazinyl) phosphorothioate at the rate of 2 pounds per 100 pounds of seed. Ten treated seeds were planted in 8 inch bulb pans containing soil infested with root-knot nematode larvae and eggs. In a similar manner, 10 untreated tomato seeds were planted in the infested soil. The pans were then removed to an 80° F. greenhouse for the duration of the experiment. The results were recorded as shown in Table 5.

TABLE 5

| Treatment | 18 Days After Planting, Percent Emergence | 25 Days After Planting | | 52 Days After Planting | | |
|---|---|---|---|---|---|---|
| | | Percent Stand | Height, in. | Percent Stand | Av. Root-Knot Index [1] | Vigor |
| Seed Untreated | 70 | 40 | 2 | [2] 10 | 3.8 | Fair. |
| Seed Treated | 77 | 77 | 4 | 77 | 1.5 | Excellent. |

[1] Same as used in Table 4 above.
[2] Severe reduction in stand due to nematodes killing the plants.

The results from the untreated seed in the table above show that the invasion of the seedling tomato plant roots by the root-knot nematode has reduced the stand drastically. Although there was some invasion of the root-knot nematode into the roots of tomato plants from seed coated by the activated carbon formulation of O,O-diethyl O-(2-pyrazinyl) phosphorothioate, it was very light and the plants at the end of the experiment were showing excellent growth.

The nematocidal compounds with which the present invention is concerned must be used in effective amounts. As noted above, they may be effectively applied to soils in various ways such as a dust for application with a conventional duster, as an emulsion for application with sprayers, on granules for application with a conventional fertilizer spreader, or adsorbed on activated carbon for application to seeds. Whatever the method of application, a good practice is to apply the phosphorothioate compounds at concentrations varying from 2 to 50 pounds per acre.

I claim:

1. A method of controlling nematodes in the soil which comprises applying thereto a phosphorothioate compound of the general formula:

$$\begin{array}{c} R-O \\ R'-O \end{array} \!\!\!\! \diagdown\!\!\!\! \underset{\diagup}{\overset{S}{\underset{\parallel}{P}}}\!\!-\!\!O\!-\!\!\!\!\begin{array}{c} \diagup N \diagdown \\ \diagdown \underset{N}{\diagup} \end{array}\!\!\!\!\begin{array}{c} -X \\ -Y \end{array}$$

(with Z on the ring)

wherein R and R' represents a member of the group consisting of lower alkyl radicals, and X, Y and Z represent a member of the group consisting of hydrogen, a halogen, a phenyl radical, and a lower alkyl radical.

2. A method as defined in claim 1 in which said compound is O,O-diethyl O-(2-pyrazinyl) phosphorothioate.

3. A method as defined in claim 1 in which said compound is O,O-diethyl O-(6-chloro-2-pyrazinyl) phosphorothioate.

4. A method as defined in claim 1 in which said compound is O,O-diethyl O-(3-methyl-2-pyrazinyl) phosphorothioate.

5. A method as defined in claim 1 in which said compound is O,O-diethyl O-(5,6-dimethyl-2-pyrazinyl) phosphorothioate.

6. A method as defined in claim 1 in which said compound is O,O-diethyl O-(5-phenyl-2-pyrazinyl) phosphorothioate.

7. A method of controlling nematodes in the soil which comprises mixing a phosphorothioate compound of the formula:

$$\begin{array}{c} R-O \\ R'-O \end{array} \!\!\!\! \diagdown\!\!\!\! \underset{\diagup}{\overset{S}{\underset{\parallel}{P}}}\!\!-\!\!O\!-\!\!\!\!\begin{array}{c} \diagup N \diagdown \\ \diagdown \underset{N}{\diagup} \end{array}\!\!\!\!\begin{array}{c} -X \\ -Y \end{array}$$

wherein R and R' represent a member of the group consisting of lower alkyl radicals, and X, Y and Z represent a member of the group consisting of hydrogen, a halogen, a phenyl radical, and a lower alkyl radical, with a finely-divided inert granular material, and mixing the resulting mixture with the soil.

8. A method according to claim 7 characterized in that the mixture of the phosphorothioate and a finely-divided inert granular material is applied as a dust on seed planted in the soil.

9. A method of controlling nematodes in the soil which comprises applying an aqueous emulsion of a phosphorothioate compound of the formula:

$$\begin{array}{c} R-O \\ R'-O \end{array} \!\!\!\! \diagdown\!\!\!\! \underset{\diagup}{\overset{S}{\underset{\parallel}{P}}}\!\!-\!\!O\!-\!\!\!\!\begin{array}{c} \diagup N \diagdown \\ \diagdown \underset{N}{\diagup} \end{array}\!\!\!\!\begin{array}{c} -X \\ -Y \end{array}$$

wherein R and R' represent a member of the group consisting of lower alkyl radicals, and X, Y and Z represent a member of the group consisting of hydrogen, a halogen, a phenyl radical, and a lower alkyl radical.

10. A nematocidal composition comprising an inert carrier, a member of the group consisting of a surface active agent and a dispersing agent, and an effective amount of a phosphorothioate compound of the general formula:

$$\begin{array}{c} R-O \\ R'-O \end{array} \!\!\!\! \diagdown\!\!\!\! \underset{\diagup}{\overset{S}{\underset{\parallel}{P}}}\!\!-\!\!O\!-\!\!\!\!\begin{array}{c} \diagup N \diagdown \\ \diagdown \underset{N}{\diagup} \end{array}\!\!\!\!\begin{array}{c} -X \\ -Y \end{array}$$

wherein R and R' represent a member of the group consisting of lower alkyl radicals, and X, Y and Z represent a member of the group consisting of hydrogen, a halogen, a phenyl radical, and a lower alkyl radical.

11. A nematocidal composition according to claim 10 in which the phosphorothioate compound is suspended in water.

12. A nematocidal composition according to claim 10 in which the phosphorothioate compound is admixed with a finely-divided inert granular material.

(References on following page)

References Cited in the file of this patent

UNITED STATES PATENTS

| | | |
|---|---|---|
| 1,982,902 | Flint | Dec. 4, 1934 |
| 2,057,044 | Meisenburg | Oct. 13, 1936 |
| 2,377,446 | Payne | June 5, 1945 |
| 2,419,973 | Hammer | Apr. 15, 1947 |
| 2,435,204 | Davidson | Feb. 3, 1948 |
| 2,473,984 | Bickerton | June 21, 1949 |
| 2,502,244 | Carter | Mar. 28, 1950 |
| 2,543,580 | Kay | Feb. 27, 1951 |
| 2,726,485 | Thomas | Dec. 13, 1955 |
| 2,730,547 | Dye | Jan. 10, 1956 |
| 2,743,209 | Jones | Apr. 24, 1956 |
| 2,754,243 | Gysin et al. | July 10, 1956 |
| 2,759,937 | Du Breiul | Aug. 21, 1956 |
| 2,770,638 | Giolito | Nov. 13, 1956 |
| 2,779,680 | Wolf | Jan. 29, 1957 |
| 2,794,727 | Barrows | June 4, 1957 |
| 2,802,021 | Heininger | Aug. 6, 1957 |
| 2,802,818 | Wheeler | Aug. 13, 1957 |

FOREIGN PATENTS

| | | |
|---|---|---|
| 713,278 | Great Britain | Aug. 11, 1954 |